United States Patent

[11] 3,584,412

[72] Inventor Thomas Y. Palmer
Seattle, Wash.

[21] Appl. No. 687,046
[22] Filed Nov. 30, 1967
[45] Patented June 15, 1971
[73] Assignee The Boeing Company
Seattle, Wash.
Continuation-in-part of application Ser. No. 362,262, Apr. 24, 1964, now abandoned.

[54] STABLE MIST GENERATION METHOD AND APPARATUS, THE PRODUCTS AND USES THEREOF
14 Claims, 16 Drawing Figs.

[52] U.S. Cl. 47/2, 252/2, 252/300, 239/102, 239/223, 239/318
[51] Int. Cl. G02b 5/24, A01g 13/06, C06d 3/00
[50] Field of Search 252/305, 300; 47/2, 58; 239/102, 223, 318

[56] References Cited
UNITED STATES PATENTS

| | | | |
|---|---|---|---|
| 3,055,144 | 9/1962 | Johnson et al. | 47/2 |
| 3,330,069 | 7/1967 | Mihara | 47/2 |

FOREIGN PATENTS

| | | | |
|---|---|---|---|
| 14,309 | 5/1924 | Australia | 47/2 |
| 820,436 | 9/1959 | Great Britain | 47/2 |

*Primary Examiner*—Robert E. Bagwill
*Attorney*—Christensen and Sanborn

ABSTRACT: Disclosed is a series of methods and apparatuses for generating a stable water mist composed of water drops coated with a monomolecular film of long chain fatty alcohols whose carbon atoms are 16 and above. The methods include vaporizing and then condensing the alcohol to form particles of a suitable size for later intimately mixing with and thereby becoming a coating film upon generated drops of water. The water drops may be generated by means of a steam nozzle, spinning disc, or the agitation caused by an ultrasonic generator focused on the surface of a water bath or in the path of a water spray. The size of the drops can be controlled by the size of the generating equipment, temperature and quality of the steam or the intensity of the ultrasonic field. The alcohol particles may be held in solution with a volatile solvent which, after the spray mixing or emulsion of this solution and water drops, erupts causing the alcohol particle to burst out from the water drops to form a coating on the drop's surface. Insecticides, fertilizers, dyes and other materials may be added to the alcohol and water sprays so long as the additives have a neutral pH and do not cause imperfections in the alcohol film around the drop.

The generated product of alcohol-coated minute water drops may be used to reduce the risk of frost damage to an orchard when the generated mist is directed through the orchard and thereby reduces the energy flux by reflecting and absorbing the heat energy which otherwise would escape into space as it is radiated from the earth and trees. The effectiveness of the mist for this purpose is enhanced when the water drops have a radius between 3 and 15 microns. In a similar manner the coated drops can form a floating lens system for reflecting and scattering infrared radiation. Another use of the generated product is to assist in the extinguishment of fires such as forest fires, by permitting a greater amount of water to be used for wetting the fuel of the fire and increasing the relative humidity closer to the fire since the coated water drops are more stable and can penetrate farther into the fire without having the moisture evaporated. Particularly good results occur when the radius of the water drops is between 50 and 100 microns. A dense opaque mist can be used to engulf an unruly mob reducing visibility to such a degree as to cause the mob to become disoriented and easily controlled.

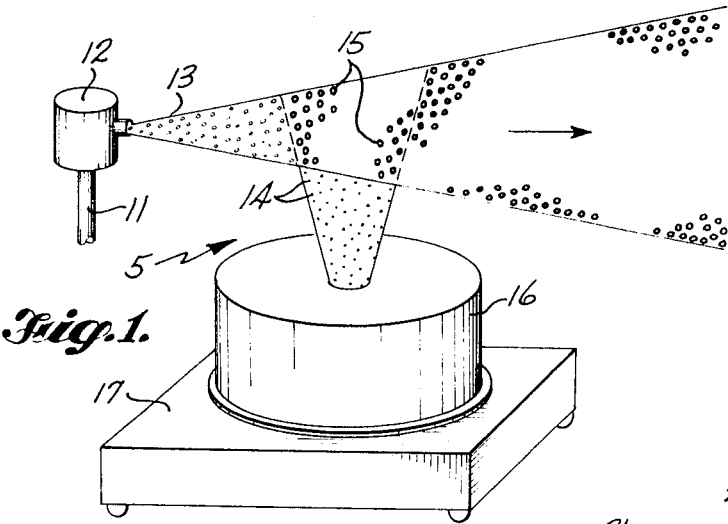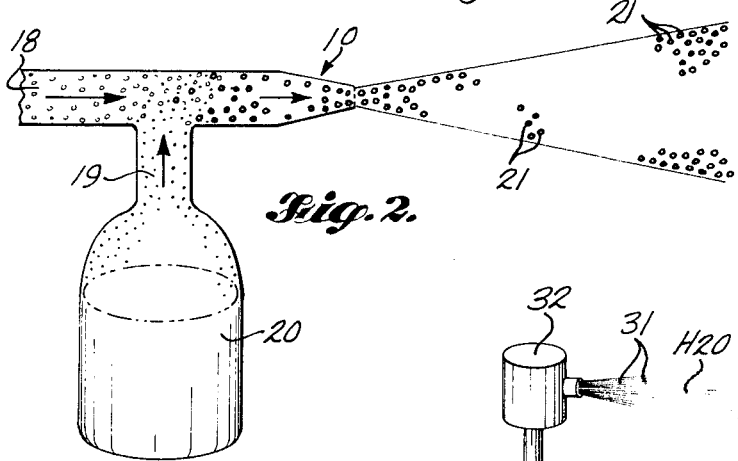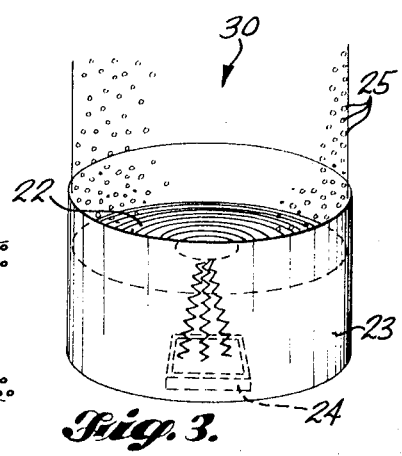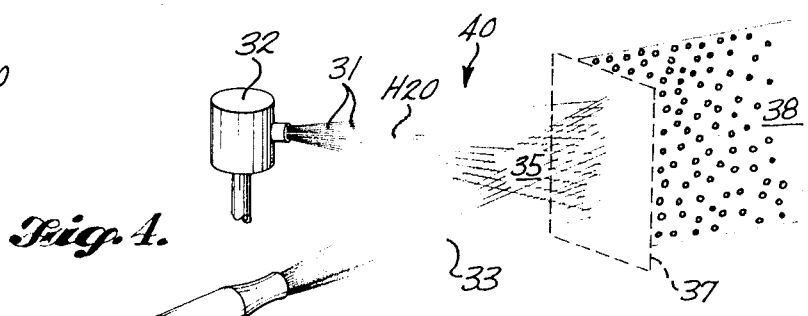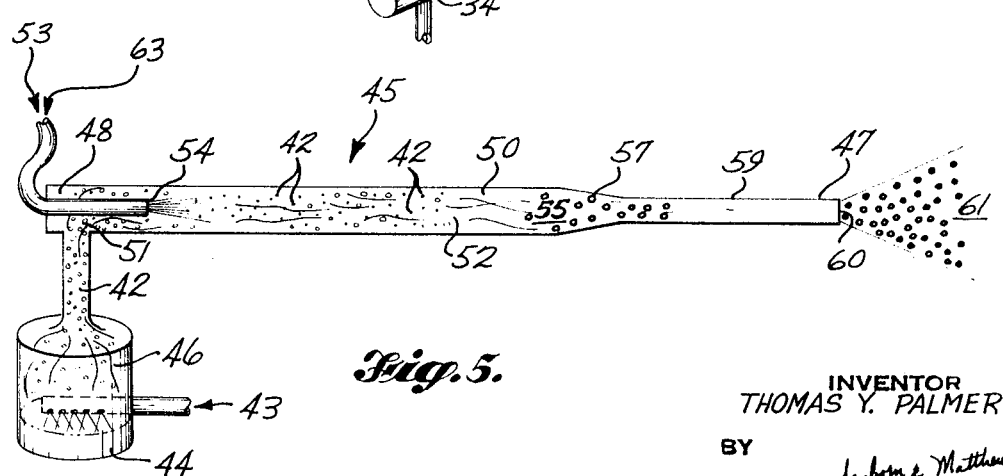

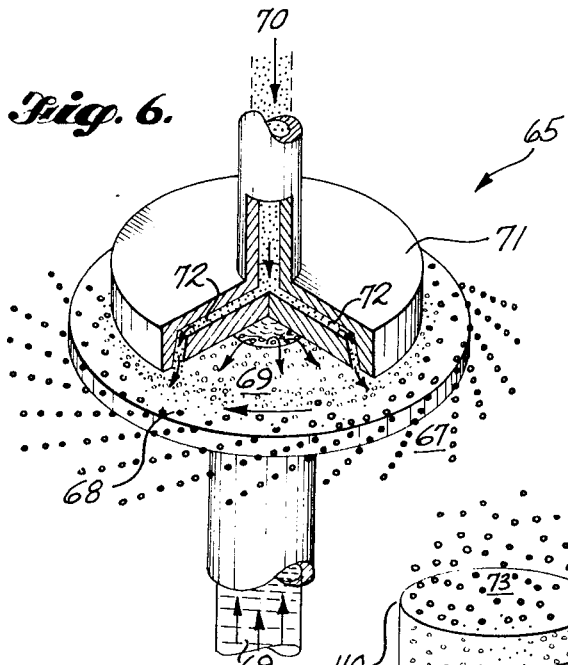
Fig. 6.
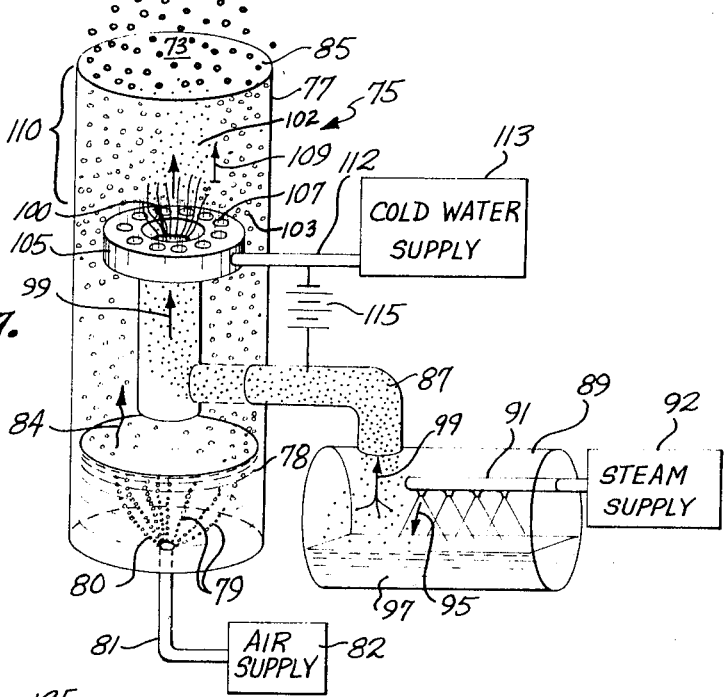
Fig. 7.
Fig. 8.
INVENTOR
THOMAS Y. PALMER

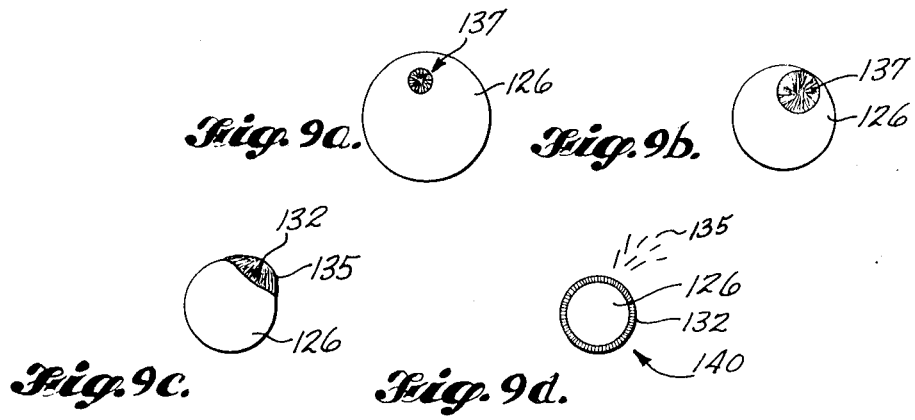
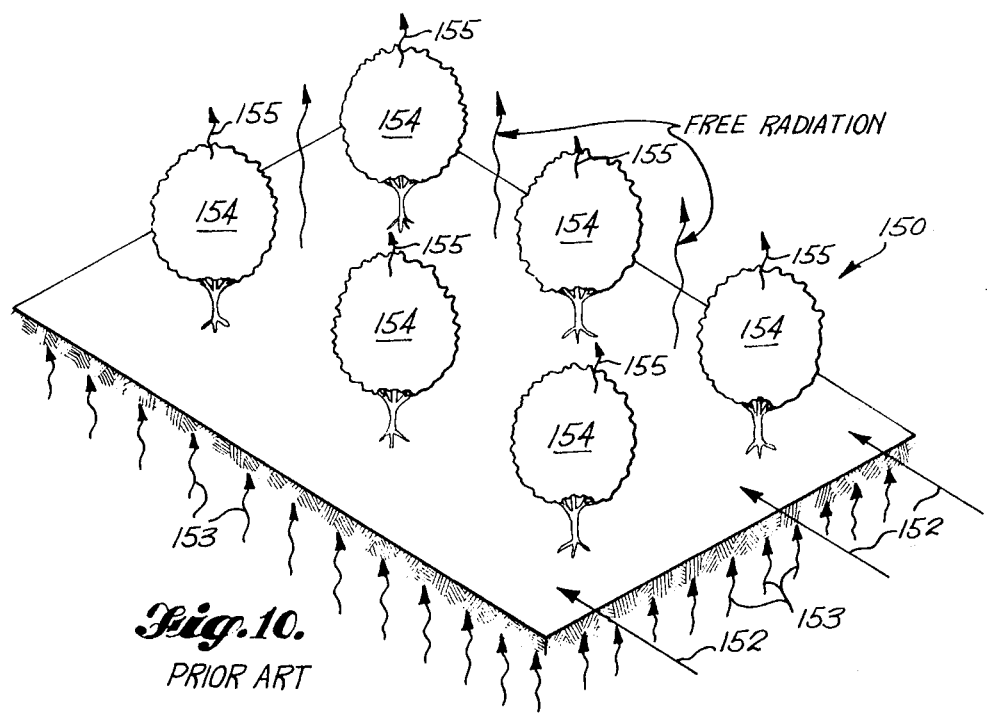

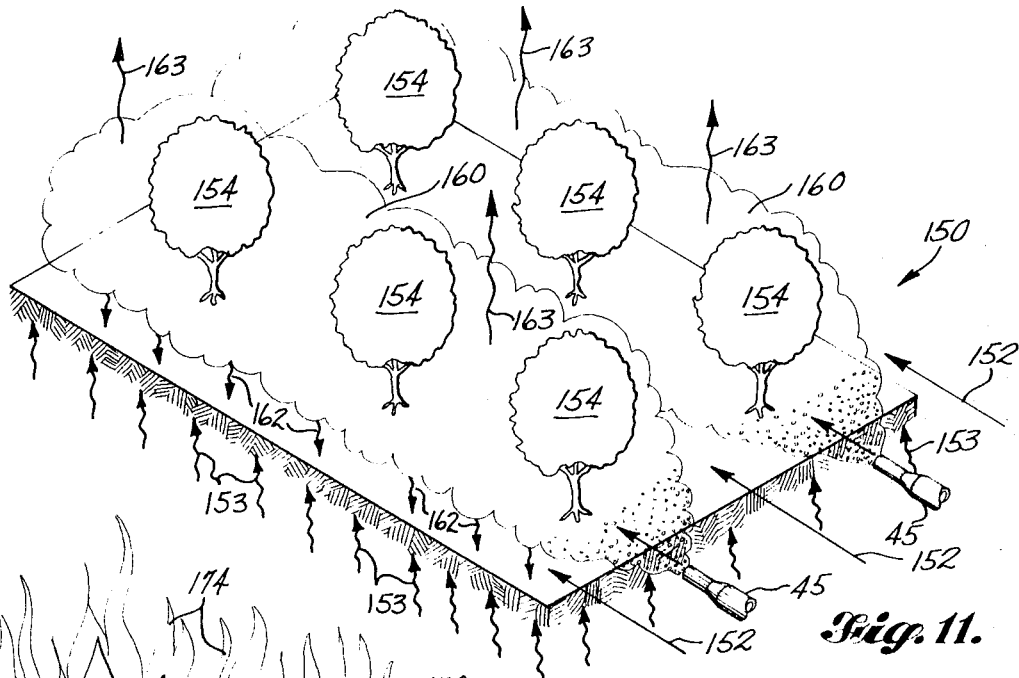
Fig. 11.
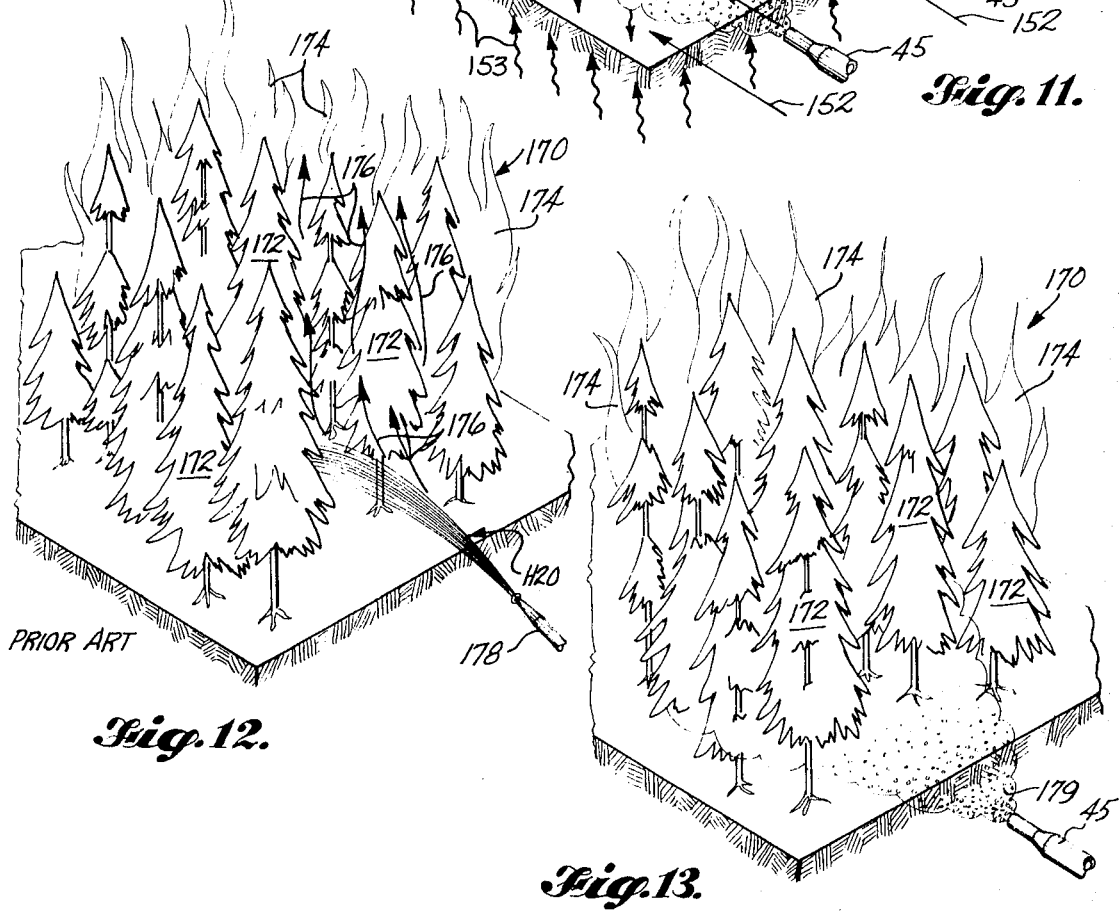
Fig. 12. PRIOR ART
Fig. 13.

STABLE MIST GENERATION METHOD AND APPARATUS, THE PRODUCTS AND USES THEREOF

CROSS-REFERENCE TO RELATED APPLICATIONS

This application is a continuation-in-part of my application entitled STABLE WATER FOG, Ser. No. 362,262, filed Apr. 24, 1964 now abandoned.

BACKGROUND OF THE INVENTION

1. Field of the Invention

This invention relates to the production of a stable water fog. More particularly stable water fogs are produced in this invention by coating the surface of a plurality of water drops with a film of alcohol which retards the evaporation and enhances the energy absorption and reflection characteristics of the water mist.

2. Description of the Prior Art

Over the years man has produced artificial mist in the form of sprays of wind-carried drops for many purposes. In war time he has used chemicals and oils to generate a fog suitable as a screen to hide his troop movements from the enemy's eyes. In the production of food and particularly apples and other fruit, man has generated oil fogs or smoke to ward off damaging frost from his food production area. In addition, man has generated a water fog somewhat inadvertently in his effort to apply liquid water to a fire zone, since part of the water becomes heated from the fire and changes into a steam vapor before it has a chance to wet the fuel of the fire to help in its extinguishment.

These uses by man of generated fog or smoke have several limitations and disadvantages which have limited their desirability and broader utilization. For the military man, smoke generation requires large quantities of hard-to-supply fog oil fuel to produce an effective screen. For the farmer, the noxious odors and the oily residue along with the limitations in visibility in the treated area add to the inconvenience of previous attempts at making frost inhibiting fogs. To the fire fighter, the waste of limited supplies of water due to the evaporation of the water prior to its ability to wet the fuel, results in many fires going unimpeded until they reach a river or other water source, or become spent as they consume all the fuel in their paths. Thus, it is seen that it would be highly desirable to have available a mist free from the detrimental characteristics of previously known toxic, corrosive, noxious and expensive manmade mists. In addition, it would be desirable to have a more stable form of water available for fighting fires without high water losses due to evaporation. Further, the ability to use a frost retardant mist without obscuring the visibility of those on the farm and those using nearby roads would be highly desirable.

While it is an easy matter to suggest that water should be used in place of the noxious, toxic fog oils previously used in generated frost-retarded smoke, water fogs have not been found practical due to their inherent instability and rapid evaporation. It is known that evaporation of water fields such as those used for the production of rice has been reduced by spraying a coating on the water surface. This coating includes ethylene oxide derivatives from a reaction of normal aliphatic alcohols and hydrogenation of the oil or fat which contains glycerides glycerines of normal fatty acids with 16 to 22 carbon atoms and two-thirds volume by weight of ethylene oxide. Such a process, while effective for submerged crops, has no practical application for air-carried water mists since the mere spraying of this coating material and water has a very poor efficiency for placing the coating on the outside of the water drops to form an evaporation retarding film around the drops. Most of the coating material in such submerged plant spray treatments is mixed within the water drops of the spray. Once the spray lands on the water surface of the field, the coating material, having a specific gravity less than one, tends to float to the water surface to retard evaporation. In general it has been difficult to develop a stable airborne water mist suitable for frost prevention and fire fighting.

It is therefore the principal object of this invention to produce an economical, stable water mist.

It is another object of the instant invention to produce a nontoxic fog of water drops coated by a monomolecular film of fatty alcohols having 16 or more carbon atoms.

A still further object of this invention is to produce a stable water fog having a drop size and selected film coating material which enhances its ability to absorb and reflect heat energy for radiation shielding purposes.

Yet another object of the instant invention is to provide an inexpensive, stable, noncorrosive, nontoxic water mist which is useful for reducing frost damage to crops.

A still further object of the instant invention is to produce a heat insulator using a stable water mist having the minimum amount of water and a minimum amount of long chain fatty alcohol coating.

Still another object of the instant invention is to provide a simple apparatus for producing a stable water mist including means for adjusting the size of the water drops making up the mist.

Still a further object of the instant invention is to provide an apparatus for vaporizing and condensing the coating material to form optimum size particles for coating the generated water drops.

Another object of the instant invention is to provide a method for the treating a crop area with a stable water mist having drops of a selected size which enhances their ability to reflect and absorb heat energy from the earth providing an insulating effect which would otherwise require much greater quantities of water, while at the same time having a drop size which is large enough that the generated mist does not interfere with visibility in the area treated.

A still further object of the instant invention is to provide a method for combating forest and other fires including the use of a stable water mist which can be applied closer to the fire to wet the fuel than uncoated water.

An additional object of the instant invention is to provide a stable water mist which can be utilized as a medium for carrying fertilizer, insecticides and other treating chemicals to the bush and leaf portions of plants while minimizing the amount of the treating material that will either fall to the ground where it is of little value or spread unduly far from the treated area with attendant toxic hazards.

SUMMARY OF THE INVENTION

The present invention relates to an improved method and apparatus for generating a stable water mist and particularly one which includes water drops coated with a long-chain fatty alcohol film whose carbon atoms number 16 or more and mixtures thereof. One such alcohol is n-Hexadecanol, also called cetyl alcohol. The various methods disclosed include a method of generating water drops of an appropriate size for later coating and for generating the coating material in particle form of appropriate size for covering the water drops. Some apparatus includes chambers for vaporizing and condensing the film-forming material and intimately mixing it with the generated water drops. Other apparatus includes the use of ultrasonic means for generating an ultrasonic field which activates and enhances the mixing and coating action between the water drops and coating material. Still other apparatus includes means for injecting steam against the coating material to vaporize it so that its condensed particles will be of an appropriate size for forming a monomolecular film on the surface of water drops generated by other steam nozzles.

The methods of reducing frost hazards in an orchard and of shielding an area from radiation capitalize on the discovery of the enhanced Mie scattering effect. Once the wavelength of the radiation is known a careful selection of shielding materials and their sizes will maximize their shielding effect while minimizing the shielding cost. Specifically with reference to the orchard frost problem, it has been determined that by selecting water in the form of a mist having a drop radius equal to or greater than the wavelength of the maximum energy flux or heat radiation generated from the earth and trees as they become cooler during the night and early morning hours of the day and coating these drops with a long chain fatty alcohol, the drops are caused to act in an absorbing and reflecting manner as if they were of a significantly greater size. While this size of uncoated drops has a significantly enhanced scattering cross section as compared to their physical cross section, their stability and scattering cross section is further enhanced by the presence of the long chain fatty alcohols film on the drops. Thus it is possible to provide a frost protection treatment utilizing a small fraction of the water and coating material that would otherwise be required for the same absorbing and reflecting effects by utilizing the Mie scattering phenomenon to advantage in the selection of coating material and drop size for the treating medium.

Since the size of the drops forming the stable water fog can be r regulated by the various conditions and apparatus involved in their generation, it is possible to develop a broad range of stable water mists useful for various purposes. As previously indicated, the size of the drops can be selected to take advantage of the efficiency enhancement of Mie scattering effect. If a wetting action is desired such as for fighting a fire, it is possible to generate drops of a large radius which will, because of their coating, resist evaporation, but because of their mass will remain close to the ground until their generated velocity has become spent, at which time they will fall to the ground to wet the fuel making it more difficult to burn. If the stable mist is to be used as a carrier medium for applying an insecticide or fertilizer to the foliage of plants, the size of the water drops is selected so that the mist will not be so heavy as to carry the insecticide and fertilizer to the ground but will allow it to float and become coated upon the foliage where it is desired.

In summary, this invention relates to the various means and methods for generating a broad range of stable water mists which have particular characteristics useful for a broad range of applications. This results in a nontoxic, cheaply generated product having very desirable use characteristics.

These and other features and advantages of the invention will become more clearly apparent from the following detailed description thereof, which is to be read with reference to the accompanying drawings.

BRIEF DESCRIPTION OF THE DRAWINGS

In the drawings FIG. 1 is a schematic drawing illustrating the first embodiment of one means for generating a stable water mist in accordance with the instant invention;

FIG. 2 is a schematic drawing illustrating a second embodiment of a means suitable for generating a stable water mist in accordance with the instant invention;

FIG. 3 is a schematic drawing illustrating a third embodiment of a means suitable for generating a stable water mist in accordance with the instant invention;

FIG. 4 is a schematic drawing illustrating a fourth embodiment of a means suitable for generating a stable water mist in accordance with the instant invention;

FIG. 5 is a schematic drawing illustrating a fifth embodiment of a suitable means for generating a water mist in accordance with the instant invention;

FIG. 6 is a schematic drawing illustrating a sixth embodiment of a suitable means for generating a stable water mist according to the teachings of the instant invention;

FIG. 7 is a schematic drawing illustrating a seventh embodiment of a suitable means for generating a stable water mist in accordance with the instant invention;

FIG. 8 is a schematic drawing illustrating an eighth embodiment of a suitable means for generating a stable water mist in accordance with the instant invention;

FIGS. 9a through 9d illustrate, in schematic form, the sequence of development of a coating of a water drop such as produced by the eight embodiment in accordance with the teachings of the instant invention;

FIG. 10 is a schematic drawing illustrating the physical conditions existing during a typical frost danger period, and FIG. 11 is a schematic drawing illustrating the treatment of the area of FIG. 10 in accordance with one method of the instant invention for minimizing frost damage;

FIG. 12 is a schematic drawing illustrating the prior art practice of utilizing water to fight a forest fire; and FIG. 13 is a schematic representation of the forest fire area shown in FIG. 12 being treated with a stable water mist in accordance with the method of the instant invention.

DESCRIPTION OF THE PREFERRED EMBODIMENT

In general, this invention is concerned with processes for, and products produced by coating water drops with long chain fatty alcohol to significantly retard their rate of evaporation. For certain uses, it is important that the mist produced have an endurance or useful life during which the mist will serve as an effective visual screen or thermal insulator. For practical purposes the methods and apparatus are adapted to use a minimum amount of alcohol for the coating function.

Since long chain fatty alcohols are abundant and relatively inexpensive, their use for the coating material for the water drops produces a product which is relatively inexpensive and nontoxic. It has also been found that as the mist dissipates and the drops fall to the ground, there is no polluting problem with the residue, such as exist with other treating and coating materials, since the fatty alcohols degenerate into steric acids and other materials which are readily consumed by the microorganisms generally existing in the crop of field areas.

The long chain fatty alcohols having 16 or more carbon atoms and ending with an OH group are attracted by van der Waal forces of the OH groups of the water to form a hydrogen bond between the alcohol molecule and the water. One of the commonly used alcohols during the development of this invention is n-Hexadecanol, also known as cetyl alcohol. The zigzag type of structure between the carbon and hydrogen atoms becomes oriented roughly perpendicular to the surface of the water drop so that many molecules of alcohol become packed together to form a monomolecular film which acts as a barrier preventing moisture from escaping through the tightly-packed zigzag structure of the filmforming molecules and also resisting additional moisture coming into the drop from outside. It has been observed that the at attached chains of alcohol molecules have a certain attraction for one another so that they stand up rather close to one another to completely envelope the water droplet. This film reduces the probability of escape of the water molecules from the droplet and thereby reduces the rate of evaporation of water from the droplet. The term used to describe the complete boundary or film layer of chains of alcohol generally perpendicular to the surface around the full circumference of the water drops "fully compressed monomolecular layer." Alcohol having less than 16 carbon atoms does not seem to be appropriate for coating the water drop since its chain length is not long enough to produce a significant reduction in the probability of escape of the water molecules from the water drop.

As an example, the amount of cetyl alcohol required to form a layer over a water drop is based upon experimental results obtained for flat surface and is calculated as follows:

Let:
$m_d$ = mass of each drop
$r$ = drop radius
$\rho$ = water density (1 in c.g.s. units)
$a_d$ = surface area of drop
$M_t$ = total mass of water
$N_d$ = total number of water drops in Mass $M_t$
$A_d$ = total surface area of the drops in $M_t$
Then:
$m_d = \pi r^2/3$ $a_d = 4\pi r^2$ $N_d = t/m_d$ and:

$A_d = i\, N_d\, a_d$ $\phantom{A_d =} 3\, M_t/\rho$

If: $r = 1$ micron, then the total surface area of this size of drops that can be formed from one gallon of water is $$A_d = \frac{3 \times 3780 \text{ gm. gal.}}{1 \text{ gm./cm.}^3 \times 10^{-4} \text{ cm.}} = 11.3 \times 10^7 \text{ cm.}^2/\text{gal. of water.}$$

It has been found that eight grams of cetyl alcohol per acre of water surface is sufficient to form a monomolecular layer over a lake under adverse conditions. This is equivalent to 1 gm/$5.06 \times 10^6$ cm$^2$ of water surface area.

Thus the amount of cetyl alcohol required to coat one gallon of water, divided into drops one micron in radius is:

$$\frac{11.3 \times 10^7}{5.06 \times 10^6} = 22.4 \text{ gm./gal} = 49.4 \text{ lb./100 gal.}$$

A more exact calculation is performed later.

A further advantage of the cetyl alcohol is that it is nontoxic for skin contact and ingestion, however, its effects when inhaled are not fully known. It has been the experience of test personnel that it is nontoxic when breathed in the concentrations used in experiments and in a field application the concentrations used would be about one thousand times less.

In order to produce a stable water fog which will achieve these many desirable objects, it is necessary that the ingredients be properly mixed to coat the water drop with the critical monomolecular layer of fatty alcohol.

A typical apparatus with which there has been satisfactory results is illustrated by the FIG. 1, as the first embodiment 5, in which water enters through inlet 11 and is pressurized and atomized into drops within the spray head 12. Then it is sprayed out of spray head 12 in the form of water drops 13. While the water is still in the form of drops the fatty alcohol is transformed into a vapor 14 and directed into the path of the water spray so as to mix with and form a monomolecular film on the surface of the water drops by condensing on the drop surface. The fatty alcohol is vaporized by heating it to its evaporation point by any suitable means such as by placing it in pan 16 on hot plate 17.

FIG. 2 shows the second embodiment 10 for mixing the fatty alcohol and water drops so as to coat the water drops by mixing a condensing jet of steam 18 and a jet of fatty alcohol 19 vaporized by a suitable means as in the burner 20. When this is done using cetyl alcohol, a dense persistent fog 21 is formed. Coating is believed to occur because the water drops from the steam jet are relatively cool and offer the optimum condensation sites for the cetyl alcohol vapor.

The stable water fog can be produced by forming a thin layer of alcohol upon the surface of water such as at 22 shown in the third embodiment 30 illustrated in FIG. 3 wherein the surface of the water 22 is coated with a layer of alcohol and an ultrasonic generator 24 within the container 23 of water is focused so that its output is concentrated on the water-alcohol interface to generate a fine mist 25. In the process of breaking away from the topmost layer, the water drops entrain a coating of alcohol. This material then spreads over the water drops, producing the desired water mist having a thin layer of alcohol on the drops making up the mist.

With reference now to the fourth embodiment 40 shown in FIG. 4, it is noted that a fog 38 can be produced by directing a fine spray of water drops 31 from a spray head 32 toward a mixing area 35 where they meet and mix with a fine spray of fatty alcohol 33 as it is ejected from nozzle 34. As the two jets 31 and 33 mix together they are passed through an ultrasonic field 37 which violently increases the agitation of the mixture so that the water drops and fatty alcohol impinge upon each other resulting in the alcohol forming a monomolecular coating on the surface of the water drops.

As a variation of this particular method, it could be considered that the mixing zone 35 permits the homogenization of the water and alcohol drops prior to their passing through the ultrasonic field 36. In one test using the fourth embodiment 40, the alcohol drops were sprayed having a size of approximately one micron in diameter and a ratio of one part of fatty alcohol to one hundred parts of water. This then resulted in a range of drop sizes of 100—200 microns just prior to passage through the ultrasonic field 37 which caused the breakup of the drops into a size of approximately one micron radius coated drops 38.

It has been found that the formation of stabilized water mists by incorporating homogenized coating materials consisting of long chain fatty alcohols containing 16 or more carbon atoms within the drop has a low efficiency in producing coated drops unless special precautionary measures are taken. This inefficiency arises from a set of probabilities which when multiplied together give a low probability of success in suitably coating the water drop with a fully compressed monomolecular layer. For purposes of explanation consider one drop of water within which there is a particle of coating material. The required size of the emulsified particle may be computed as follows: It is known that a long chain fatty alcohol in a fully compressed monomolecular layer on a water surface suitable for lowering evaporation rates will cover approximately 20 square Angstroms ($10^{116}$ cm.$^2$).

The surface area $A$, of the drop of radius $r$ is:

$A + 4\pi r^2$ cm.$^2$/drop.

The number of evaporation retarding molecules required to cover the drop is:

$$n = \frac{4\pi r^2}{20 \times 10}{}^{-16} \text{ molecules/drop}$$

The number of molecules per gram molecular weight is Avagadro's number $N = 6.024 \times 10^{23}$ divided into the molecular weight $m$, of the coating material, or $m/n$ gr./molecule The number of grams $M$ of the coating material is then $$M = \frac{m}{n} \text{ gr./molecule} \times \frac{4\pi r^2}{20 \times 10^{-16}} \text{ molecules-drop}$$

As an example: The 16 carbon, long chain fatty alcohol has a molecular weight of 242.44 for this case:

$$M = \frac{242.44}{6.024 \times 10^{23}} * \frac{4\pi r^2}{20 \times 10^{-16}} \text{ gr./drop}$$

$= 2.54 * 10^{-6} r^2$ gr./drop of the 16 carbon straight chain alcohol.

The required radius $r_p$ of the emulsified particle of cetyl alcohol is the cube root of the mass in grams $M$ divided by the density $\rho_c$ of the coating particle.

$$r_p = \frac{M^{1/3}}{\rho_c}$$

for the above cited example $\rho_c = 0.8176$ gr. cm.$^{13}$ so that $$r_p = \frac{2.54 * 10^{-6} r^{2 1/3}}{0.8176} = 1.458 * 10^{-2} r^{2/3}$$

The ratio of the radius of the required homogenized particle to the radius of the water drop to be coated is:

$$\frac{r_p}{r} = \frac{0.01458}{r^{1/3}}$$

The ratio of the mass of the water drop $M_w$ to the mass of cetyl alcohol required to give it a monomolecular fully compressed coating is:

$$\frac{M_w}{M} = \frac{\frac{4}{3}\pi r^3}{\frac{m * 4\pi r^2}{N * 20 * 10^{-16}}}$$

For example, the ratio for cetyl alcohol is:

$M_{tc}/M = 1.67 * 10^6 r$, where $r$ is in centimeters.

Another mist generator is the fifth embodiment 45 shown in FIG. 5. Particles 42 of the coating material are formed by impinging a spray of dry st steam 43 onto the surface of the coating compound 44 in a vaporizing chamber 46. This impingement produces particles 42 of the correct size for coating the desired size of the water drop produced at the end of the nozzle 47, as will be described subsequently. A typical temperature of the dry steam 43 is 260° F. when the coating material is $1-n$ hexadecanoic alcohol (16 carbon atoms) although this temperature may be varied to produce different sized coating particles. Instead of dry steam 43 other nonoxidizing gases, such as pressurized nitrogen or carbon dioxide could be used to generate particles 42 of the correct size for coating.

The mixture of coating particles 42 and steam 43 is introduced near the rear end 48 of a chamber 50 at point 51 into the region 52 formed at one end of the chamber 50. At the rear end of chamber 50 there is introduced through insert tube 54 a stream of low quality steam 53. Typical values of pressure and temperature of water saturated steam 53 are 15 p.s.i.g. and 250° F. As the water saturated steam 53 is sprayed into the chamber 50 it flashes into steam vapor and water drops 55. While this evaporative action in region 52 prevents the disposition of the coating material particles 42 onto the surface of water drops 55, it does insure intimate mixing of particles 42 with the steam and water drops 55. In addition, this spraying action and flow assist in the pumping of the particles of coating material 42 from the generator 45. Further along the chamber 50 there is a venturi restriction formed at 57 to reduce the size of the chamber 50 forming an acceleration chamber 59. As the mixture of water drops 55, steam 53 and coating particles 42 pass through the venturi reduction 57 into the smaller diameter acceleration chamber 59, particles 42 become accelerated reducing the pressure which, due to the resultant expansion of the steam vapor 53, tends to produce supersaturation. This tendency toward supersaturation causes condensation of the stream vapor 53 on the water drops 55 which have been carried along the steam. The condensing vapor flux toward the drops carries the particles of coating material 42 which are also in the stream and intermittently mixed with the water drops 55 to the surface of the drops 55 in a Stefan flow until sufficient coating material 42 has become collected on any one drop to coat it with a monomolecular film. The bulk of this formation takes place before the exit 60 of the nozzle 47 where the coated drops exhaust into the atmospheric region 61. The drops of water 55 which were initially so large as to have insufficient amounts of the coating material 42 on them are shrunk by evaporation after exiting into the atmospheric region 61 until the monomolecular layer of alcohol 42 is sufficiently compressed to become effective in retarding evaporation at which time the rate of drop evaporation decreases by a factor of approximately one thousand. The final water drop size inside the tube is adjustable from sizes as small as one micron to one thousand microns or greater by varying the dimensions of the apparatus and the pressures and temperatures of the injected water saturated steam 53. The final size of the coating water drop is controllable by varying the dimensions of the apparatus and the temperature and flow rates of the dry steam 43 used to evaporate the coating material 44. These parameters can thus be varied so as to utilize the coating material 44 and the water 55 to maximum efficiency.

It has also been ascertained that other materials 63 such as insecticides, fertilizers, light and other radiation absorbing or reflecting materials such as carbon black, zinc sulfite and another such materials such as carbon black, zinc sulfite and other such material can be introduced into chamber 50 with saturated steam 53 from tube 54. The resulting solution may have buffering material added to it if necessary to maintain a neutral pH. The resulting mist, depending upon the size of the coated drops, will be useful for a wide variety of treatments.

One other apparatus for producing water drops having a desired radius is that represented as the sixth embodiment 65 in FIG. 6. The method practiced by apparatus 65 is that of producing water drops 67 by using a spinning disc 68 with water 69 flowing up through the center axis of the disc 68 and radially outwardly therefrom in the direction shown by the arrows. The coating material 70 flows from the upper feeder 71 through the conduits emanating downwardly at 72 onto the surface of water drop 69.

The equation for the drop diameter $d$, from a spinning disc of diameter $D$, rotating with an angular velocity of $w$ spraying a liquid from its edge with a surface tension T, of a density P is:

$$d = \frac{K}{w}\left(\frac{T}{DP}\right)^{1/2}$$

where $K$ is the constant 4.5.

The surface tension of water is about 70 dynes cm.[116 1]. The addition of a monomolecular long chain fatty alcohol layer to the water surface reduces this value to that characteristic of the coating material such that the surface tension of the coated water is about 30 dynes cm.[11]. If a drop diameter of 20 microns or $2 \times 10^{13}$ cm is desired, for water density of 1 gram cm[13], the above equation is used to solve for $w$ and $D$ as:

$$w^2 D = \left(\frac{K}{d}\right)^2 \frac{T}{P} = 1.518 \times 10^8 \text{ cm. (rad. sec.}^{-1})^2$$

The coating material 60 may be either solid or dissolved in a liquid. As the flow of water continues outward it is spun off the sharp edge of the spinning disc 68.

As the drops come off the disc 68 they are equivalent to a cube of a height $h$, with one side covered by the coating material. The volume of a sphere is $4/3 \pi r_1^3$ which has a volume equivalent to that of a cube, $h^3$:

$$h^3 = 4/3 \pi r_1^3$$

$$h = \left(\frac{4\pi}{3}\right)^{1/3} r_1$$

Only one side of this cube is coated so that the coated area A is:

$$Ac = h^2 = \left(\frac{4\pi}{3}\right)^{2/3} r_1^2$$

The drop will shrink until this area covers the sphere with a fully compressed monomolecular layer, i.e., $$Ac = 4\pi r_2^2 4\pi r_2^2 = \frac{4\pi^{2/3}}{3} r_1^2$$

solving for $r_2$:

$$r_2 = \frac{R_1}{(36\pi)^{1/6}} = 0.455 r_1$$

Thus the final radius of the fully coated drops will be approximately one-half the size of the drops as they come off the disc 68. The addition of greater amounts of coating material 70 to water can reduce this size reduction.

Alternatively, feed 71 may be left off and the fine particles of the coating material 60 may be spread on the radially flowing water 69 by a sifting device or other means.

Another suitable apparatus for generating stable fog 73 is shown as the seventh embodiment 75 illustrated in FIG. 7. The stable fog generator 75 includes generating chamber 77 which may be filled at the lower end by supply of clean water 78 through which is bubbled air 79 emanating from a spray outlet 80 positioned at the lower end of the chamber 77 and serviced by a suitable conduit 81 connecting the chamber 77 with the suitable air supply 82. The bubbling of the air 79 through the water 78 results in a saturated vapor, generally designated by the arrow 84, which flows upwardly through the generated chamber 77 toward its open end 85.

Connected by means of conduit 87 to the generator 77 is a vaporizing chamber 89 having an inlet spray head 91 connected to a suitable steam supply 92 for impinging pressurized steam, shown as arrow 95, down upon the coating material 97 which may be long chain fatty alcohol whose carbon atoms number 16 or more or a mixture thereof. As the pressurized steam 95 impinges upon the coating material 97 it causes it to become vaporized and mix with the pressurized steam flowing upwardly, as shown by arrow 99, out through the conduit 87 into the generating chamber 77. It exits from the conduit 87 through an expansion nozzle 100 to become mixed with the saturated vapor 84.

As the two vapors of steam and coating material indicated generally by arrow 99 exit from expansion nozzle 100 there is a release of pressure causing a condensation of the vapors into particles of coating material 102 and liquid water drops 103. This jet stream of water drops 103, particles 102 and saturated vapor 84 pass through and around ring 105. Nozzles 107 are spaced around ring 105 to spray cold water generally indicated by arrow 109 in such a manner as to mix the cold water with the saturated air jet 84, steam formed water drops 103 and coating material 102 in particle from in the mixing region generally indicated at 110 at the upper end 85 of the generating chamber 77. Cold water 109 is supplied to ring 105 through a conventional conduit 112 connecting the ring 105 with s suitable cold water supply 113. In the mixing region 110 the excess of water vapor 103 produced by the steam 95, carrying the coating material 102, and the water vapor 84 combine to cause the cold water drops 109 to grow. In the growth process, the coating material 102 is carried to the surface of the drops 103, 109 thereby producing water drops with a monomolecular coating of the coating material 102. The saturated air 84 flowing upward from the bottom of the chamber 77 provides a positive flow creating a layer of floating air preventing impingement of the coated drops 73 on the walls of the chamber 77.

The attraction of the particles 102 of coating material 97 and the water drops 109 may be further enhanced by applying an electrical potential 115 between the cold water supply conduit 112 and the coating material jet 99 as it passes through conduit 87 to oppositely charge the particles 97 and drops 109 to increase their attraction. This applied electrical potential has the additional benefit of increasing the dispersion of the water sprays due to the repelling of particles electrically charged with a like charge. As the drops 109 grow the water vapor flows inwardly toward the drop carrying the coating material 102 with it until the drop has grown to an appropriate radius coincident with the radius of the gathered coating material 102. This growth process will continue until enough of the coating materials 102 have reached the surface of the drop 109 to form a fully compressed monomolecular layer. At this point the flux of water vapor to increase the said of the drop will cease. After this time, only a very small amount of coating material 102 will be added if the drops are less than 20 microns in radius, since the collision efficiency between the particles 102 and drops 109 of this size and smaller is below 0.1 percent.

It has also been found that simply spraying a mixture of water and homogenized coating material such as long chain fatty alcohol whose carbon atoms number 16 or more and mixtures thereof to produce a coated fog is of extremely low efficiency. This low efficiency arises because of the low probability of the small particle of coating material being at the surface of the drop of water as the drop is formed to a size suitable for the coating material to form a monomolecular film around it. If the coating material in particle form is in the interior of the water drop, it will be bonded to the water surrounding it by the hydrogen bond previously referred to. As the water drop shrinks to such a size that the particle of coating material reaches the surface of the drop it is necessary for the surface tension of the water to overcome the attractive forces of the hydrogen bonding between the water of the drop and the material before the coating material will be able to be positioned outside of the drop. Since all of this activity of the drop shrinkage and of breaking of the surface tension of the water must take place within the lifetime of the drop, the efficiency of spraying a mixture of water and homogenized coating material is extremely low because the lifetime of an uncoated ten micron water drop is less than 5 seconds at humidities less than 90 percent.

Reference is now directed to FIGS. 8 and 9 for a disclosure of a method which overcomes the inefficiency generally characteristic of spraying a mixture of water and homogenized coating material to produce a coated fog. The eighth embodiment 125 of an apparatus for generating a coated stable water mist is shown in schematic form in FIG. 8. Water 126 for the mist comes from a suitable water supply 127 and is piped through a suitable conduit 128 to an homogenizer chamber 130. The coating material 132, such as long chain fatty alcohol, whose carbon atoms number 16 or more and mixtures thereof, is fed into a suitable mixing chamber 134 where it is mixed with a material 135 which vaporizes at atmospheric pressure. It is preferred that the two materials 132 and 135 be mutually soluble. For example, a mixture of long chain fatty alcohol coating material 132 is mixed with a solvent 135, such as liquid butane formed under pressure, so that the butane remains in liquid form. From the mixing chamber 134 the resulting mixture 137 of the coating material 132 and its solvent 135 is conveyed to the homogenizer 130 where it is mixed with the water 126 to produce a homogenized mixture of water 126 and mixture 137. This homogenized mixture is then jetted out through nozzle 139 to the atmosphere to form the stable fog generally indicated at 140. If desired, an electrical potential 142 can be established on the exit side of nozzle 139 to assist in breaking up the spray into drops. Good results have been obtained when this electrical field is 960 volt/cm.

For purposes of understanding the formation of a coated stable water drop as a result of a utilization of the eighth embodiment 125, as shown in FIG. 8, reference is now had to the sequence shown in FIGS. 9a to 9d. As shown in FIG. 9a the water drop 126 exits from the homogenizer 130 through nozzle 139 it contains within itself the mixture 137 of the volatile solvent 135 and the coating particle 132. As water drop 126 is released to the atmosphere through nozzle 139 it shrinks, as shown in FIG. 9b, and the volatile material, such as the butane 135, starts to vaporize and expand until the drop 126 has a gas bubble formed in its surface such as shown in FIG. 9c. The coating particle 132 is positioned to break out of the water drop 126 as in fact it does as shown in FIG. 9d where the coating material 132 has broken through the surface of the water drop 126. At this instant a monomolecular coating is rapidly formed around the water drop 126 thereby establishing the stable fog 140 as the vaporizing gas 135 escapes to the atmosphere.

It is therefore seen that by using a volatile solvent 135, the coating material 132 has been able to blow itself out of the water drop 126 once the drop is ejected into the atmosphere. For example, if the size of water drops is to have a radius of 10 microns it would required a coating particle of long chain fatty alcohol, such as hexadecanol having 16 carbon atoms of 1.5 microns in diameter. It is therefore seen that by premixing the coating particles 132 with a volatile solvent 135 prior to homogenizing and mixing water drops with the coating material, it is possible to increase the efficiency of positioning the coating material on the surface of the drops to produce a mist of stable water drops.

One of the uses for the stable water mist is that of preventing frost damage to crops, such as apples and other fruit. To understand the manner in which the stable mist operates, it is necessary to understand the various sources of heat and heat losses involved in an area such as orchard 150 shown in FIGS. 10 and 11 where the stable mist would be applied.

Basically, a cooling effect results due to the fact that during nighttime and early morning hours, heat energy from the sun's radiation does not fall into the area of the orchard. Thus it can be considered that the lack of the sun's radiation provides one cooling effect of the orchard area. A second cooling effect of the orchard area results from the convection cooling which comes from cool air 152 as it is blown into the orchard area 150. Experience has shown that if the velocity of the air is much above 5 miles per hour, frost will not form on the fruit because, either the wind turbulence will bring to the ground warmer upper atmosphere air or the temperature will be so low that freezing will take place. Therefore, when considering frost prevention the conditions include the cooling effect of a slight breeze of air coming from cooler areas into the orchard area.

The earth in the orchard area 150 receives heat energy from the sun during the day. It is considered a heat source during the night but the conduction of the heat from below to the soil surface is less than the loss by radiation of heat energy upwardly away from the earth's surface as indicated by arrow 153. Another small source of heat energy in the orchard area is the trees 154 as they radiate heat energy, shown as arrow 155, during the night hours which they absorbed during the day hours. In summary, the temperature decrease during the night hours is due to the radiation of heat energy from the earth 153 up toward space, and the major cooling effects result from the cooler air 152 being blown into the orchard area 150.

To understand the heat insulation or shielding function performed by the stable water mist 160 it is necessary that there is an understanding of the shielding effect of materials in general and the shielding effect of specific materials used in the stable mist in particular. The first of these effects to be considered is the effect of size of the drops. The second could be considered the effect of selection of materials used for the shield.

It has been found, and it is known, that when the ratio between the radius of the particles being used as a shield and the wavelength of the radiating energy is equal to one, there is a phenomenon called Mie scattering which, depending upon the index of refraction and coefficient of absorption, may enhance the reflective and absorbing effectiveness of the shielding material significantly. To be more specific, if the radius of a water drop used as a shielding material is equal to 10 microns, it may act in an absorbing, refracting and reflecting way as if it has 4 to 6 times more cross-sectional area than the actual water drop used when it interacts with electromagnetic radiation having a wavelength near to 10 microns. This Mie scattering effect upon the apparent cross section to radiation is increased by another factor of 2 to 6 if the water drops of 10 microns in radius are coated with a thin film of a long chain fatty alcohol layer the real part of whose index of refraction is greater than the square root of two.

The significance of the 10 micron water drop size and cross section Mie scattering effect noted above becomes more clear when there is an understanding of the wavelength of the energy flux 153, i.e.., the flow of heat energy radiated from earth. When the energy flux is charted in a graph form against its wavelength, it is found that the major portion of earth generated energy flux has a wavelength within the range of 3 to 15 microns with its maximum portion having a wavelength of 10 microns when the temperature is zero degrees Centigrade. Since this is the temperature at which frost would otherwise occur, it is most appropriate that water drops be formed with a radius of 10 microns, or at least in the range of radius between 3 and 15 microns, to take advantage of the Mie scattering effect.

To complete this discussion as to the shielding effect of the stable water mist, it is necessary that there should be an understanding of the absorption coefficient of the particular materials used in the stable water mist. Again, with reference to a chart of the absorption coefficient, on one hand, and wavelength of the energy flux on the other, it is noted that for liquid water the curve peaks quite quickly at a wavelength of about 9 microns to a maximum point of about 10 microns, and then comes down partway to an effective range of up to 15 microns. Cetyl alcohol, on the other hand, peaks up earlier and falls off with its peak curve starting at about 3 microns peaking up to its maximum point at about 7 microns, and dipping down to its least significant point at about 11 microns, and then building back up again. Thus, it appears that a combination of liquid water and cetyl alcohol covers quite nicely the heat energy wavelength as radiated from the earth in the orchard area 150.

The air temperature of the orchard area can be maintained above the frost formation temperature in most frost danger situations if only a relatively small decrease in the heat loss results from the reflecting of such energy back to earth by means of the imposition of a cloud of stable water mist over the orchard area.

When considering other materials which might also have long chain carbon hydrogen atoms terminating with an OH group, and suitable for reflecting and absorbing earth generated energy flux, it has been found that the alcohol molecule is quite effective when the carbon atoms number 16 or more since such materials have an index of refraction above the square root of two and also have a molecular structure which forms good surface covering films.

What then are the characteristics of this film layer material which make it suitable as a material for combining it with water drops for reducing the frost danger in an orchard? Basically, long chain fatty alcohol is an abundant material. As the mist of water drops coated with the alcohol film finally disperse and evaporate, the residue is nontoxic. As a matter of fact, microorganisms such as are present in most all crop areas apparently like to eat the stearic acid formed in the residue, and in this way regardless of the number of repeated applications of the mist to a single orchard area, the alcohol residue will not accumulate because of its consumption by the microorganisms in the orchard. While in its mist form, the drops are large enough so that they do not interfere with the visibility of those operating on the fields or driving on any roads adjacent to the fields. This, of course, is not the case with previously used smoke generation systems which often leave a smudgy oil film in the area where the cloud has been formed. In addition, the alcohol-coated water drops are nontoxic.

The balance of the system is emphasized when attention is directed to the fact that after the hexadecanol, that is 16 carbon atom long chain fatty alcohol, has been first vaporized and then condensed, the condensation product formed is a particle of bunched hexadecanol long chain molecules. The cross section diameter of this particle is approximately 1.7 microns. This is the exact size of hexadecanol particles required to coat a 10 micron radius water drop. Thus, it is seen that the condensation of hexadecanol results in the formation of a hexadecanol particle formed from the same number of hexadecanol molecules as is necessary to coat a 10 micron radius water drop. This size water drop, as mentioned before, is the one which gives the optimum reflective and absorptive effect for the type of energy flux radiated by the earth.

In operation, as shown in FIG. 11, a series of stable mist generators, such as embodiment 45, are placed upwind of the orchard area 150 to be treated and the generation process as previously described is initiated. The mist that forms is approximately 60 feet wide and 30 feet deep and is continuously generated as it moves along across the orchard being carried by the wind 152. It has been found that the normal life of the mist is approximately one hour at 0° Centigrade. It has also been found that it requires about 10 pounds of water per acre and 0.01 pounds of hexadecanol per acre for a 3 hour run at an initial temperature of 0° Centigrade.

As illustrated in FIG. 11, the heat energy introduced into the mist 160 by means of the steam assists in overcoming the cooling effect cause by the wind convection cooling of lower temperature air 152. This mist 160 itself as it covers the ground surface also acts as a retardant shield as indicated by arrows 162, of the heat energy or energy flux to reduce the net heat loss, indicated by arrow 163, as it is radiated toward space from the earth and from the trees themselves. The size of the drops making up the mist are so large that visibility in the treated orchard is not adversely affected. This make it possible for cars to move along a bordering road to the orchard without having driver visibility adversely affected.

Table I is helpful in understanding the interrelationship between the lifetime of a water drop coated in accordance with the teachings herein and its fall distance under different conditions of relative humidity.

TABLE I.—LIFETIMES AND FALL DISTANCES FOR A 10 MICRON WATER DROP COATED WITH HEXADECANOL AT 0° C. WITH AN INITIAL VELOCITY OF 1.25 CM./SEC.

| Relative humidity, percent | Lifetime, seconds | Vertical distance meters |
|---|---|---|
| 0 | 504.8 | 2.12 |
| 10 | 560.9 | 2.35 |
| 20 | 631.0 | 2.65 |
| 30 | 721.2 | 3.03 |
| 40 | 841.4 | 3.53 |
| 50 | 1,009.7 | 4.24 |
| 60 | 1,262 | 5.30 |
| 70 | 1,682 | 7.06 |
| 80 | 2,524 | 10.7 |
| 90 | 5,048 | 21.2 |
| 95 | 10,096 | 42.6 |

While the description of a stable fog has been related to its use in reducing frost hazard to an orchard area, the stable mist has been used for other crops. For example, a test run using an experimental unit of the mist generator was begun when the temperature over a blueberry bog was dropping dangerously low. Once the stable fog had been generated with the cloud at about bush top level, the temperature held 5° F. higher than the temperature outside of the fog blanket thereby saving the blueberries from low temperature damage. In another test in an area with very little wind, the temperatures in the zone covered by the artificial fog rose under the fog from 30° F. to 36° F. after 20 minutes under the stable fog. Other uses where the radiation of energy flux having a wavelength from 3 to 15 microns is to be reflected and absorbed could utilize the stabilized mist as herein described.

The foregoing treatment description for reducing frost damage in an orchard is merely representative of one practical utilization of the electromagnetic radiation scattering and reflecting properties of the stable mist of the instant invention. A very broad field of applications of these properties should become more apparent as more experience is gained through the use of the stable mist in shielding areas from various sources of radiation. Basically it can be considered that the operator can generate a stable mist with customized drop size, coating material and possibly additives to establish a floating shielding lens system for scattering, reflecting and absorbing radiation. Depending upon the wavelength of the radiation, the properties of the mist can be varied to optimize the effects of the shield.

Scattering and absorption of electromagnetic radiation effects with microwave radiation have been explained in the technical literature for single particles of isotropic and nonisotropic materials. The design of coated water particles for optimizing a radiation shield mist can be mathematically obtained. Quantitive estimates of absorption and scattering for coated water particles can be made from geometric optics as follows:

Since the index of refraction, $n$, of cetyl alcohol is greater than that of water (1.428 as compared to 1.333), the critical angle is smaller (44.5° as compared to 48.6°). Thus an incident light beam will penetrate over approximately 15 percent less of the water drops area if the drop is coated with cetyl alcohol. Inside the drop, however, the presence of the multiple layers enhances absorption and reflection. For example, for normal incidence the reflecting power $R$ is:

$$R = \frac{(n-1)^2}{(n+1)^2}$$

For air to water, $R=0.0625$; for air to cetyl alcohol, $R=0.0900$; and for air to water coated with cetyl alcohol $R=0.00427$. With the radiation encountering all of these materials in one coated drop the combined effect is a substantial attenuation of the radiation. Transmission of radiation through a drop (at normal incidence neglecting multiple reflections) is then 87.8 percent for water drops and 81.9 percent for coated water drops.

To insure that the radiation striking the coated drop will be absorbed or reflexed back toward the source of radiation the coating material must have an index of refraction within the range between the square root of two (1.414) and two. Below this range, the radiation is focused beyond the drop in a direction away from the source. Above this range, the radiation may be focused within the drop but not to the reflecting back surface of the drop. Within the range the radiation is focused at the back reflecting surface of the drop causing it to follow a path back toward its source.

Furthermore, in order to increase radiation absorption and reflection within the coated drops certain additives can be incorporated into the drops. Since the medium through which the radiation passes within the drops is water the index of refraction for the additives is within the range between 1.333×2 or 1.885 to 1.33× 2 or 2.667. Such additives can be soluble or in soluble in water or even in particulate form as long as the drop has or is buffered to a neutral pH. Since they are good radiation absorbers and are also nontoxic, carbon black and zinc sulfide can be used as additives for the coated drops to enhance their ability to absorb and reflect radiation.

One use for such a radiation shield, beyond that described for orchards to reduce losses of earth generated infrared radiation, is as a thermal radiation shield around a defense site. A missile launching station or population center could have an additional margin of protection from a nuclear explosion if a mist could be generated in the path of the thermal radiation to reflect, scatter and absorb some of the harmful electromagnetic radiation before it reaches the site or population center. In essence the generated mist forms a temporary but stable floating lens system for scattering, reflecting and absorbing radiation. The size of the drops and selection of drop and coating materials takes advantage of the cross section enhancement Mie scattering effect. In addition the index of refraction for the long chain fatty alcohol coating materials with 16 carbon atoms or more is between the square root of two and two yielding excellent reflecting, scattering and absorption results by focusing the radiation into the interior back surface of the drop. Further it has been found that with such coated drops there is a skin effect which generates standing waves for spraying the radiation back to its source.

Since the fog generating equipment described herein carries out the concept of forming a monomolecular evaporation regarding coating about the individual water drops, its operation increases substantially the useful life of such drops opening up many uses for the generated product. One such use is that of combating forest fires. As shown in FIG. 12 a schematic representation of a forest 170 is depicted with trees 172 engulfed in flames 174 as the area is being subjected to conventionally applied liquid water 176 directed toward the fire 174 by means of water nozzle 178. Due to the heat energy and local air turbulence around the fire a good portion of the water 176 directed toward the fire is evaporated and has no effect on the fire. The only way that the fire becomes controlled is by soaking the potential fuel of the fire so that it cannot be raised to the kindling point or otherwise by denying oxygen to the fire area.

FIG. 13 illustrates the same fire zone 170 with the trees 172 engulfed in flames 174 as it is treated by the improved technique possible as a result of the instant invention. For this treatment a fog generator or series of fog generators such as the fourth embodiment generator 45 is placed upwind of the fire to generate a stable mist of water drops generally indicated at 179.

It has been found that for purposes of wetting the potential fuel for the fire, the drop size of the water drops should be held in the range between about 50 and 100 microns. Since the individual drops are coated with the monomolecular long chain fatty alcohol film having 16 or more carbon atoms and mixtures thereof, the drops are more stable and less likely to evaporate before a good portion of the generated water drops reaches some part of the fuel close to the fire zone. Thus, the fire is more easily controlled with a less amount of water using the stable water mist of the instant invention than would be needed if ordinary water were used because the stable film will permit more of the fuel wetting water to get closer to the fire zone before part of it become evaporated.

If the treatment requires the addition of additives such as fertilizer or insecticides which are desired to be coated on the leaves of crops rather than on the ground, it is possible to select a drop size which will provide the best floating medium for carrying the additives to the leaves. If the additives are to soak the area such as in the case of the fire fighting application the drop size can be increased such that they will drop to the ground after being carried by the wind to the application area. Other additives such as dyes for coloring a screen and inhibiting visibility can be used with the stable mist generated in accordance with the instant invention. Whenever additives are considered for addition to the stable mist of the instant invention, it is necessary that the additives be buffered to a neutral pH so that they will not break down the coating function of the long chain fatty alcohol monomolecular film. It is also necessary that the additives should not be of a nature such as ethyl alcohol which will dilute the fatty alcohol and cause holes in the film such that the evaporation retarding film will not be fully formed and the drops will not have the extended life otherwise provided by the monomolecular long chain fatty alcohol film.

Another example of the variety of uses for a stable water mist is that of riot control. One test demonstrated that a mist could be formed in less than a minute which filled a large room with a stable drops having a size between 0.5 microns to 5 microns. This mist so engulfed the occupants of the room that they became completely disoriented. Drops in this range are opaque to such an extent that the room's occupants could not see their hands more than 6 inches from their faces. The mist remained effective for nearly one half hour even after doors were opened to increase air circulation in the room. With this use in mind, prison cells and common areas could be equipped with nozzles connected to a mist generator. Once a riot started it could be quickly controlled for a long enough period to bring in adequate force without inflicting injury upon the occupants of the areas so treated.

It is therefore seen that depending upon the particular characteristics desired, a wide range of improved treatments is available by utilizing the stable water mist concept as described herein.

What I claim is:

1. In the process of protecting open-air objects such as foliage against frost, fire, or the like by forming an artificial fog thereabout, the steps of generating a mass of vaporous droplets consisting essentially of water, at a point adjacent the foliage, causing relative motion between the mass of droplets and a mass of water insoluble particles consisting essentially of a monohydric long chain fatty alcohol having 16 or more carbon atoms therein, so as to impinge one mass on the other and coat the outside surfaces of the water droplets with the alcohol, and discharging the mass of droplets into the atmosphere about the foliage so that the coated droplets form the required fog.

2. The method according to claim 1 wherein the mass of droplets is discharged into the atmosphere as a spray, and the droplets are coated by releasing vaporous alcohol particles into the atmosphere across the path of the spray.

3. The method according to claim 2 wherein the alcohol particles are released into the atmosphere as a spray which is directed across the path of the water spray.

4. The method according to claim 3 wherein the intersecting water and alcohol sprays are passed through an ultrasonic field.

5. The method according to claim 1 wherein the mass of water droplets is discharged into the atmosphere from a container, and the droplets are coated by releasing vaporous alcohol particles into the container across their path of discharge.

6. The method according to claim 5 wherein the vaporous alcohol particles are infused under pressure with a gaseous water insoluble solvent therefor, before being intermixed with the droplets in the container.

7. The method according to claim 5 wherein the vaporous alcohol particles are generated by spraying steam onto the alcohol.

8. The method according to claim 7 wherein the alcohol is in a solid state when it is bombarded by the steam.

9. The method according to claim 7 wherein the particles are generated in an enclosure and released through an expansion nozzle.

10. The method according to claim 5 wherein the mass of water droplets is generated by aerating a body of water in the container.

11. The method according to claim 5 wherein the water droplets and the vaporous alcohol particles are oppositely electrostatically charged to enhance the attraction therebetween.

12. The method according to claim 5 wherein the droplets are discharged through a venturi nozzle.

13. The method according to claim 1 wherein the mass of water droplets is discharged into the atmosphere from a container, and the droplets are coated by interposing a film of liquid alcohol particles in the container across their path of discharge.

14. The method according to claim 13 wherein the mass of water droplets is generated by ultrasonically dispersing a body of water in the container.